United States Patent [19]

Iizawa et al.

[11] Patent Number: 5,741,874
[45] Date of Patent: Apr. 21, 1998

[54] METHOD FOR PRODUCING POLY(VINYL CHLORIDE)

[75] Inventors: Hideto Iizawa; Susumu Kato; Shuichi Sakakibara, all of Okayama, Japan

[73] Assignee: Mitsubishi Chemical Corporation, Tokyo, Japan

[21] Appl. No.: 525,295

[22] Filed: Sep. 7, 1995

[30] Foreign Application Priority Data

| Sep. 12, 1994 | [JP] | Japan | 6-217291 |
| Sep. 29, 1994 | [JP] | Japan | 6-235356 |
| Sep. 30, 1994 | [JP] | Japan | 6-237874 |

[51] Int. Cl.$^6$ .................. C08F 2/10; C08F 14/06
[52] U.S. Cl. .................. 526/344.2; 526/345
[58] Field of Search .................. 526/344.2, 345

[56] References Cited

U.S. PATENT DOCUMENTS

| 3,282,459 | 11/1966 | Wilson | 220/3 |
| 3,931,131 | 1/1976 | Noziri et al. | 526/344.2 |
| 4,050,901 | 9/1977 | Pfeiffer et al. | 260/695 |
| 4,125,574 | 11/1978 | Kastner et al. | 526/345 |
| 4,752,640 | 6/1988 | Tomishima et al. | 526/344.2 |

FOREIGN PATENT DOCUMENTS

| 0 053585 | 6/1982 | European Pat. Off. . |
| 0 395080 | 10/1990 | European Pat. Off. . |
| 395080 | 10/1990 | European Pat. Off. . |
| 1205978 | 8/1959 | France . |
| 729499 | 5/1955 | United Kingdom . |

Primary Examiner—Thomas R. Weber
Attorney, Agent, or Firm—Oblon, Spivak, McClelland, Maier & Neustadt, P.C.

[57] ABSTRACT

A method for producing a poly(vinyl chloride) comprises polymerizing vinyl chloride or a mixture of copolymerizable monomers containing vinyl chloride as the main component, in an aqueous medium, wherein the polymerization is carried out in a reaction vessel which is formed by arranging partition plates at certain intervals at right angles to the outer surface of an inner barrel and overlaying outer strips on and between the free ends of the partition plates to thereby form a flow passage unit having a flow passage for a heating medium defined by the partition plates, the inner barrel and the outer strips ("a temperature control element"); fixing the temperature control element in a vessel body so as to oppose the side of the outer strips with a gap to the inner surface of the vessel body, and sealing the upper and lower portions of the gap formed between the outer strip side of the temperature control element and the inner surface of the vessel body to form a gap chamber.

20 Claims, 11 Drawing Sheets

5,741,874

METHOD FOR PRODUCING POLY(VINYL CHLORIDE)

The present invention relates to a method for producing a poly(vinyl chloride). In particular, it relates to a method for producing a poly(vinyl chloride) of high quality with high productivity.

Generally, an autoclave used for the polymerization of vinyl chloride or a mixture of copolymerizable monomers containing vinyl chloride as the main component (hereinafter generally referred to as a "vinyl chloride type monomer") comprises an enclosed pressure vessel which is formed by welding dish-like end plates at both ends of a vessel body 1' having a cylindrical trunk portion with an outer jacket 22 for cooling or heating the contents in the vessel (FIG. 10).

In the reaction vessel of this type, the wall thickness of the vessel was large since the pressure strength had to be maintained by the vessel body, and therefore the heat transfer coefficient through the wall was low. Therefore, when the vessel was used for the polymerization of a vinyl chloride type monomer which causes exothermic reaction, it was difficult to obtain a high production rate. Further, in case of increasing the vessel size, it was necessary to increase the wall thickness of the vessel body in order to sustain the mechanical strength, whereby it further reduced the heat transfer coefficient.

In order to solve the above-discussed disadvantage concerning heat conduction, there is proposed an inner jacket type reaction vessel (Japanese Unexamined Patent Publication No. 147502/1982) which is so formed as shown in FIG. 11 that partition plates 23 are arranged with certain intervals at right angles to the inner surface of a vessel body 1' and inner strips 24 are overlaid bridging the free ends of the partition plates, whereby a helical flow passage 9 partitioned by the partition plates is formed between the inner strips and the inner surface of the vessel body in the vessel of this type, the pressure strength can be increased by reducing the intervals of the partition plates in comparison with the inner diameter of the vessel body, and the heat transfer coefficient can be increased by reducing the wall thickness of the inner strips.

However, the inner jacket type vessel, although it is excellent in thermal conductivity, has disadvantages due to the fact that a number of welded portions 29 which are between the inner strips, expose to the inner surface of the vessel to which contents contact during the polymerization of the vinyl chloride type monomer. The surface of the welded portions is generally rough, and there are sometimes faults in the welded portions. When there is a rough surface in the portion to which the reaction mixture contact (hereinafter, referred to as a "contact area") in the polymerization, the formation and deposition of polymer scales are apt to occur. When the formed scales peel off and mix with a product, the quality of the product is deteriorated (in particular, when the product is processed to form a film, so-called fish eye (FE) wherein unmolten substance remains in the film takes place). In an attempt of preventing the deposition of polymer scales which deteriorate the quality, there are proposed a technique of extremely smoothening the weld lines or the introduction of a special deposition-preventing/removing technique. However, costs for such facilities and maintenance become undesirably high.

Further, stainless steel is generally used as material for the inner surface of the reaction vessel in consideration of the corrosive effect by hydrogen chloride evolved with the progress of the polymerization of the vinyl chloride type monomer. On the other hand, a residual stress due to welding concentrates in a welded area in the stainless steel material. Accordingly, when the polymerization of vinyl chloride type monomer is conducted with use of the inner jacket type vessel in which there are a number of adjacent weld lines on the inner surface of the vessel, there is a danger of stress corrosion cracking owing to the evolved hydrogen chloride (chloride ions). To avoid such disadvantage, careful and frequent inspections on the weld lines are necessary, so that maintenance is troublesome and cost for the inspection are increased.

In order to solve the disadvantage of the inner jacket type processing vessel, there was proposed a reaction vessel of excellent heat transfer (Japanese Unexamined Patent Publication No. 141223/1992). Namely, as shown in FIGS. 12 and 13, partition plates 26 are arranged with intervals at right angles to the outer surface of an inner barrel 25, and outer strips 27 are overlaid bridging the top ends of the partition plates whereby a flow passage unit 28 having a flow passage 9 for a heating medium partitioned by the partition plates between the inner barrel and the outer strips (hereinafter, referred to as a "temperature control element") is formed, and the temperature control element is fixed in the reaction vessel with the outer strips opposing the inner surface of a vessel body 1' in a close contact state. The inventors of this application proposed a method of producing a vinyl chloride type polymer with use of this type of the reaction vessel, (Japanese Patent Application No. 216205/1994). In this type of vessel, the weld area, which gave a disadvantage in the inner jacket type vessel, was reduced to the same extent as the outer jacket type vessel, and the problem of the deposition of scales was improved. However, it was difficult to bring the temperature control element into the perfect contact with the inner surface of the vessel body 1' when the temperature control element was fixed in the vessel, and there was unavoidably a slight gap between them. Accordingly, during the polymerization of the vinyl chloride type monomer in such a vessel, there are possibilities that the reaction mixture invades into the gap, polymerizes, and deposits the polymer particles there. The polymer scales thus formed are apt to peel off and mix with a product, to deteriorate the quality of the product.

Further, a distortion may take place in the outer surface of the temperature control element owing to the presence of a large number of welded areas. This distortion becomes larger as the size of the temperature control element is larger. In a large-sized vessel, the close-contact between the temperature control element and the vessel body is very difficult to attain. Accordingly, it was found difficult to apply the reaction vessel of the proposed type to a large sized vessel for improving the productivity of poly(vinyl chloride).

It is an object of the present invention to solve the disadvantage of conventional techniques while features of the inner jacket type vessel and the temperature control element contacting type vessel are retained, and to provide a method for producing poly(vinyl chloride) with a reaction vessel which has a high heat transfer coefficient; provides excellent productivity; is free from the deposition and the formation of polymer scales, and is capable of obtaining a polymer product of high quality and little fish eye.

According to the present invention, there is provided a method for producing poly(vinyl chloride), which comprises polymerizing vinyl chloride or a mixture of copolymerizable monomers containing vinyl chloride as the main component, in an aqueous medium, and in a reaction vessel which is formed by arranging partition plates at certain intervals at right angles to the outer surface of an inner barrel and overlaying outer strips on and between the free ends of the partition plates to thereby form a flow passage unit having a flow passage for a heating medium defined by the partition plates, the inner barrel and the outer strips ("temperature control element"), fixing the temperature control element in a vessel body so as to oppose the side of the outer strips with a gap to the inner surface of the vessel body, and sealing the upper and lower portions of the gap formed between the outer strip side of the temperature control element and the inner surface of the vessel body to form a gap chamber.

The present invention will be described in detail with reference to the drawings.

[Vessel]

Vessel Body

Figure 1:
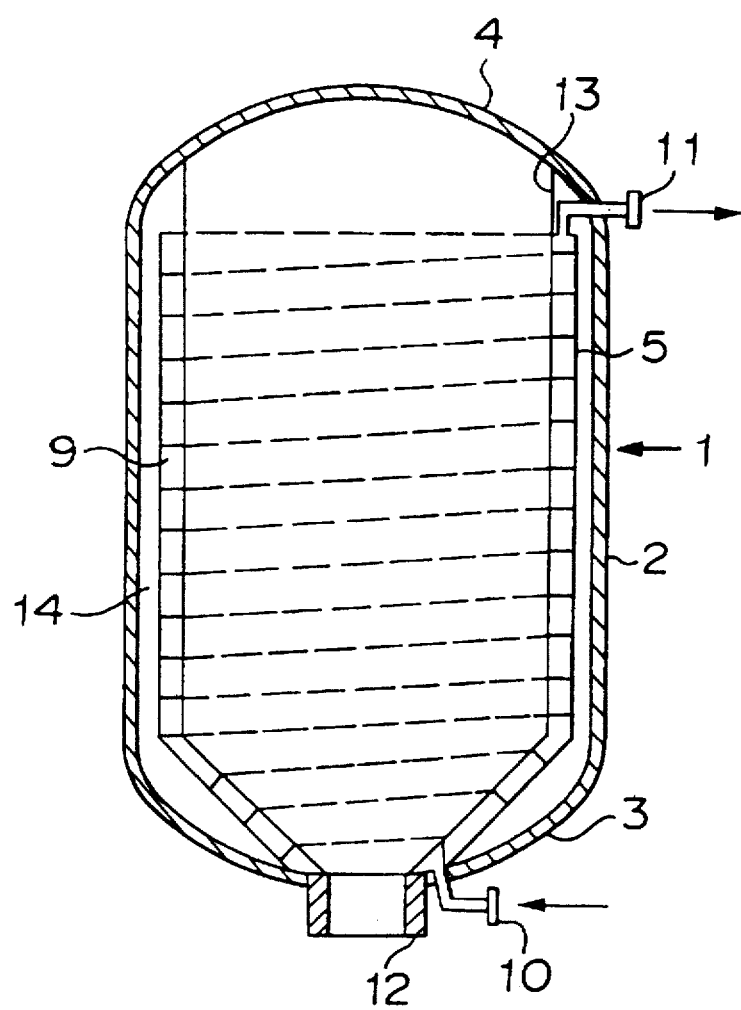
FIG. 1 is a longitudinal cross-sectional view of an embodiment of a temperature control element type reaction vessel usable for practicing of the method of the present invention.
Figure 9:
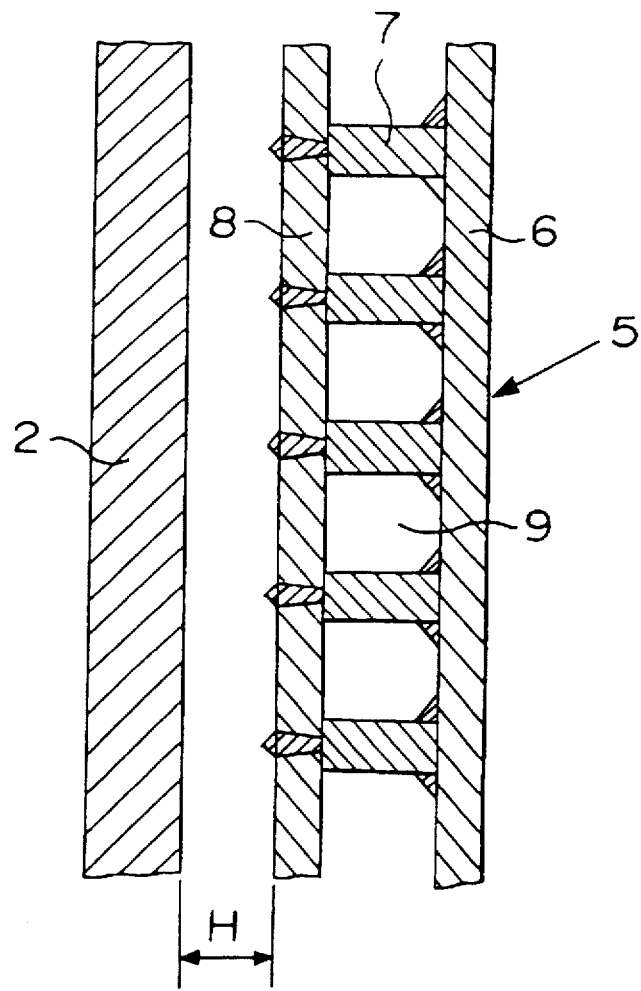
FIG. 9 is an enlarged view of an important portion of the temperature control element type reaction vessel used for the method of the present invention.

A temperature control element type reaction vessel used for carrying out the method of the present invention is constructed as follows. As shown in FIGS. 1 and 9, a temperature control element 5 having a flow passage 9 for a heating medium, which defined by an inner barrel 6 and outer strips 8 with use of partition plates 7, is formed by arranging the partition plates 7 with certain intervals at right angles to the outer surface of the inner barrel 6, and overlaying the outer strips 8 on and between the top ends of the partition plates 7. The wall thickness of the inner barrel 6 depends on the strength required and the intervals of the partition plates. However, since the intervals of the partition plates are small in comparison with the length in the longitudinal direction of a vessel body 1 and the wall thickness of the inner barrel 6 can be thin so that a high heat transfer coefficient is obtainable.

As the material for inner barrel 6, stainless steel (such as a solid body of stainless steel, stainless steel.carbon steel cladding material and so on, preferably, SUS 316L), glass lining material and so on can be used in consideration of the anti-corrosion property of the contact area as described before. However, material is not particularly limited to the above-mentioned as far as it is durable to stress corrosion cracking due to chloride ions.

In order to prevent the deposition of scales, it is preferable that the inner surface (at the side of the contact area) of the inner barrel is smooth. As methods for smoothing the surface, a method such as buffing, electropolishing or the like which is generally employed for industrial purposes can be used. The surface roughness should be at most 10 μm, preferably at most 3 μm, more preferably at most 1 μm in terms of the maximum height Rmax (Ry). In measuring Rmax, the method ruled in JIS B 0601 may be used.

Since the proportion of the welded area to the whole contact area in the main body chamber of the reaction vessel is extremely smaller than that in an inner jacket type vessel, the formation and deposition of polymer scales are limited and the quality of product produced is excellent. Further, since the possibility of the stress corrosion cracking is low, the maintenance and inspection may be substantially the same as that for the conventional outer jacket type vessel. And, a generally used antifouling agent can also be used for the method of the present invention.

The outer diameter of the temperature control element is formed to be smaller than the inner diameter of the reaction vessel, and the temperature control element is fixed in the vessel body so as to oppose the side of the outer strips of the temperature control element with a gap to the inner surface of the vessel body. The fixing of the temperature control element should be conducted so that the center axis of the element is substantially in agreement with that of the vessel body. Thus, a gap corresponding to the difference of their radii is formed between the inner surface of the vessel body and the outer surface (i.e. the side of the outer strips) of the temperature control element, the gap being substantially uniform in the circumferential direction.

The lower end portion of the temperature control element may be directly attached and sealed using continuous welding or the like to a bottom end plate 3 at a portion corresponding to the periphery of a vessel nozzle 12, or may be hermetically attached to it by interposing a partition wall. With respect to the upper end portion of the temperature control element, a partition wall 13 is usually attached to the cylindrical trunk portion 2 of the vessel or an upper end plate 4.

Thus, a structure having a gap chamber between the outer surface of the temperature control element fixed inside the vessel body and the inner surface of the vessel body is formed. The structure prevents invasion of the reaction mixture into the gap whereby the deposition and formation of scales can be prevented.

The partition wall for sealing an upper portion and/or a lower portion of the gap is preferably provided with an expansion.shrinkage absorbing member which can absorb the heat-expansion and shrinkage of the temperature control element. Further, it is necessary that the partition wall or the like has a sufficient strength to withstand temperature and pressure generally applied in the polymerization of a vinyl chloride type monomer. Further, it is preferable from the viewpoint of maintenance to reduce the difference between an inner pressure of the gap chamber and an inner pressure in a space (a main body chamber) which is surrounded by the inner surface of the vessel body (normally, portions of the upper and lower end plates) and the inner barrel of the temperature control element, whereby the destruction of the temperature control element and welded portions for sealing the upper and lower portions of the gap between the element and the vessel body due to the reaction pressure, etc. can be prevented. In this case, the pressure strength of the partition wall is not necessary to such an extent as mentioned above. Specifically, the difference of inner pressure between the main body chamber and the gap chamber should be 3 Kg/cm$^2$ or lower, preferably, 1 Kg/cm$^2$ or lower, more preferably 0.7 Kg/cm$^2$ or lower.

Figure 3:
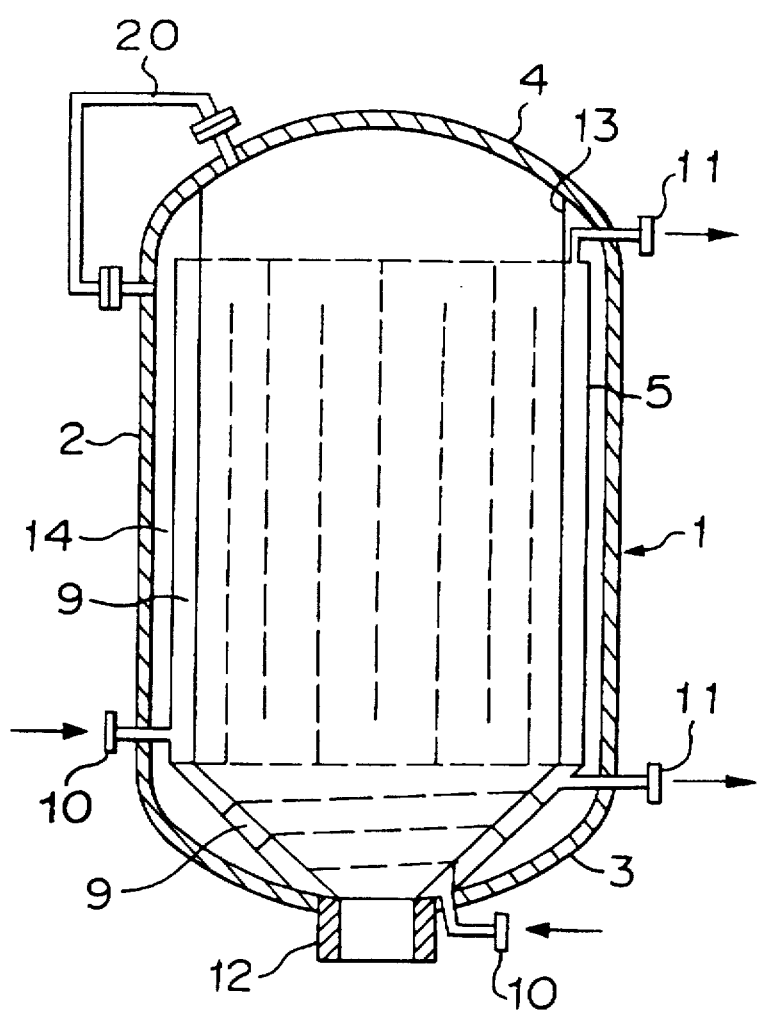
FIG. 3 is a longitudinal cross-sectional view of another embodiment of a temperature control element type reaction vessel with a communicating pipe usable for practicing the method of the present invention.
Figure 4:
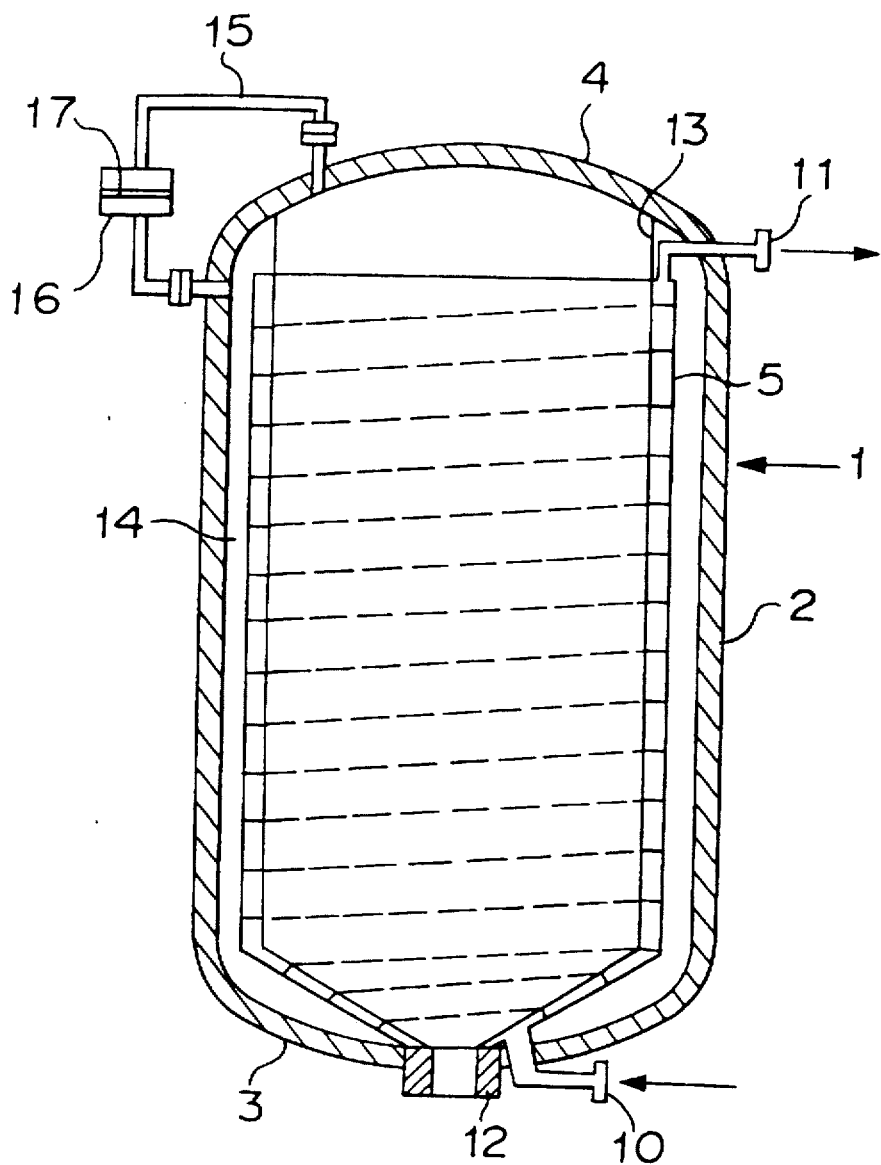
FIG. 4 is a longitudinal cross-sectional view of another embodiment of a temperature control element type reaction vessel with a pressure equalizer (of a balancing piston type) usable for practicing the method of the present invention.

The difference between the inner pressure of the main body chamber and that of the gap chamber can be reduced by various methods such as;

(1) communicating the main body chamber with the gap chamber by means of a communicating pipe 20 as shown in FIG. 3;

(2) connecting them with a pipe 15 equipped with a pressure equalizer 16;

(3) forming a communication opening in the partition wall;

(4) detecting the inner pressures of the main body chamber and the gap chamber, and maintaining the difference of the pressures within the above-mentioned range by controlling the inner pressure of the gap chamber by the use of an additionally installed pressure adjusting device.

Any of these methods can be applied, as well as their suitable combination.

The pressure equalizer may be of a balancing piston type such as an air cylinder type, a sealed liquid pressurizing cylinder type using a mechanical seal or the like, or of a separating membrane type such as a diaphragm type or a bellows type may be used. These pressure equalizers have constructions capable of rendering the pressure difference at both sides of the equalizer to be a predetermined pressure or lower such as, for instance, 3 Kg/cm$^2$ or lower by using a sliding piston or a pressure-withstanding membrane such as a diaphragm or a bellows. As material for the pressure equalizer, use of stainless steel is preferable. However, any material having an anti-corrosive property and a strength durable to a pressure change during the polymerization of the vinyl chloride type monomer, can be used. In order to maintain the difference between the inner pressure of the main body chamber and the inner pressure of the gap chamber within a predetermined range by the use of the above-mentioned communicating pipe or the pressure equalizer, the pipe should not be plugged by the poly(vinyl chloride) particles and/or the scales. For this purpose, it is preferable to continuously or intermittently supply liquid such as water during polymerization into the main body chamber through the communicating pipe or the pipe at the main body chamber side of the pressure equalizer (hereinafter, generally referred to as a "pressure equalizing pipe") whereby poly(vinyl chloride) particles are rinsed into the reaction vessel without forming any polymer scales.

Figure 5:
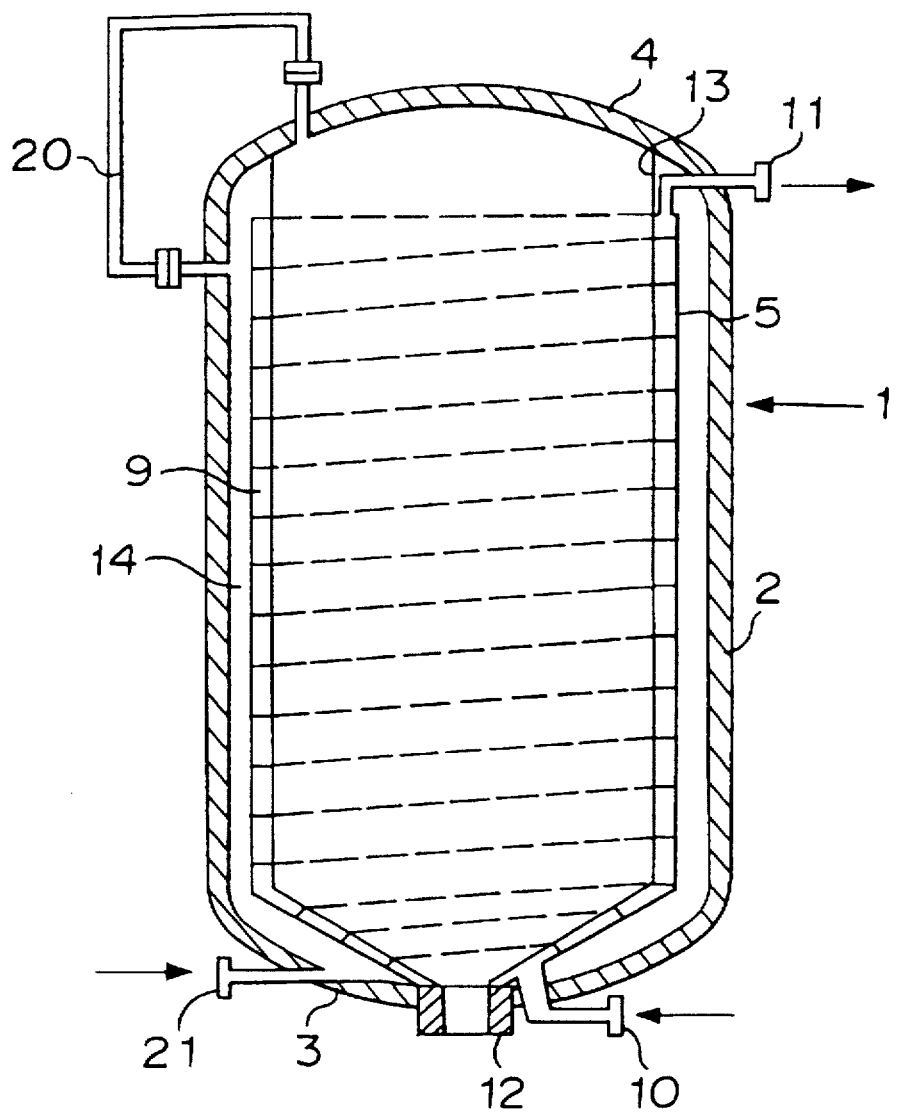
FIG. 5 is a longitudinal cross-sectional view of an embodiment of a temperature control element type reaction vessel with a communicating pipe for supplying liquid, which is usable for practicing the method of the present invention.
Figure 6:
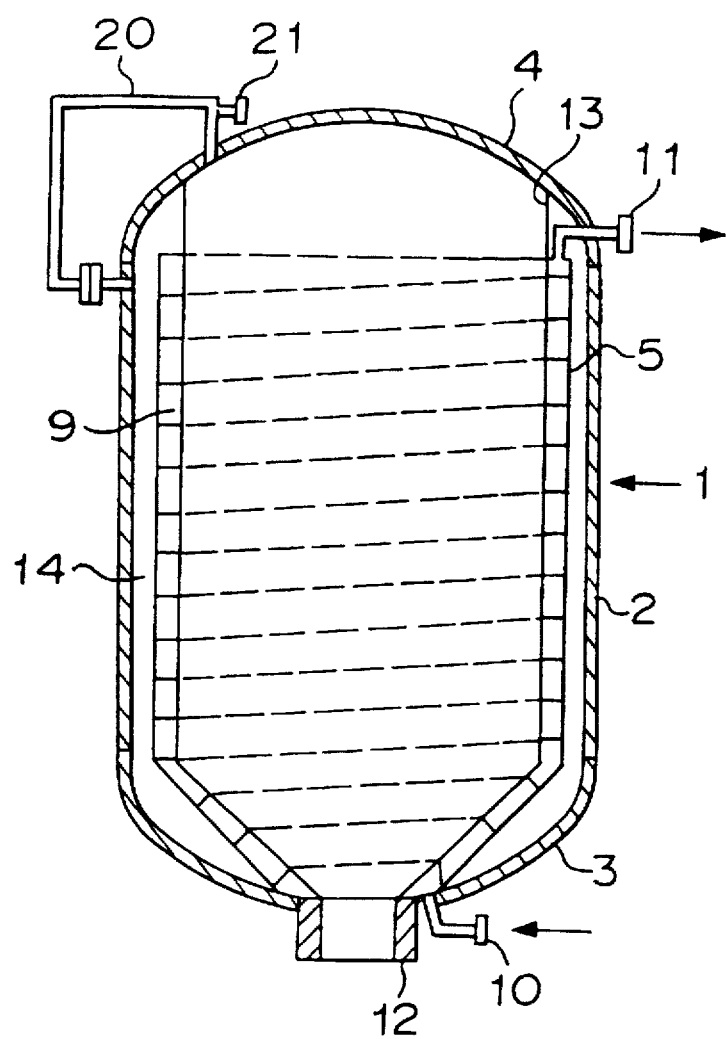
FIG. 6 is a longitudinal cross-sectional view of another embodiment of a temperature control element type reaction vessel with a communicating pipe for supplying liquid, which is usable for practicing the method of the present invention.
Figure 7:
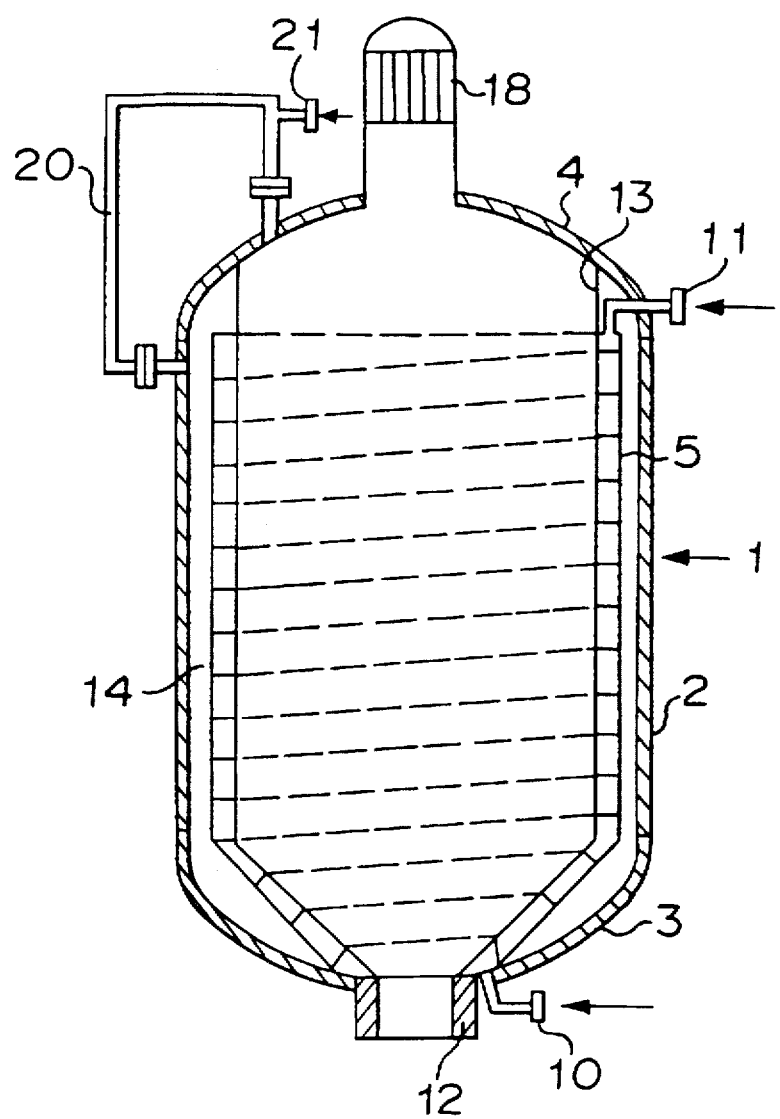
FIG. 7 is a longitudinal cross-sectional view of another embodiment of a temperature control element type reaction vessel with a reflux condenser and a communicating pipe for supplying liquid, which is usable for practicing the method of the present invention.
Figure 8:
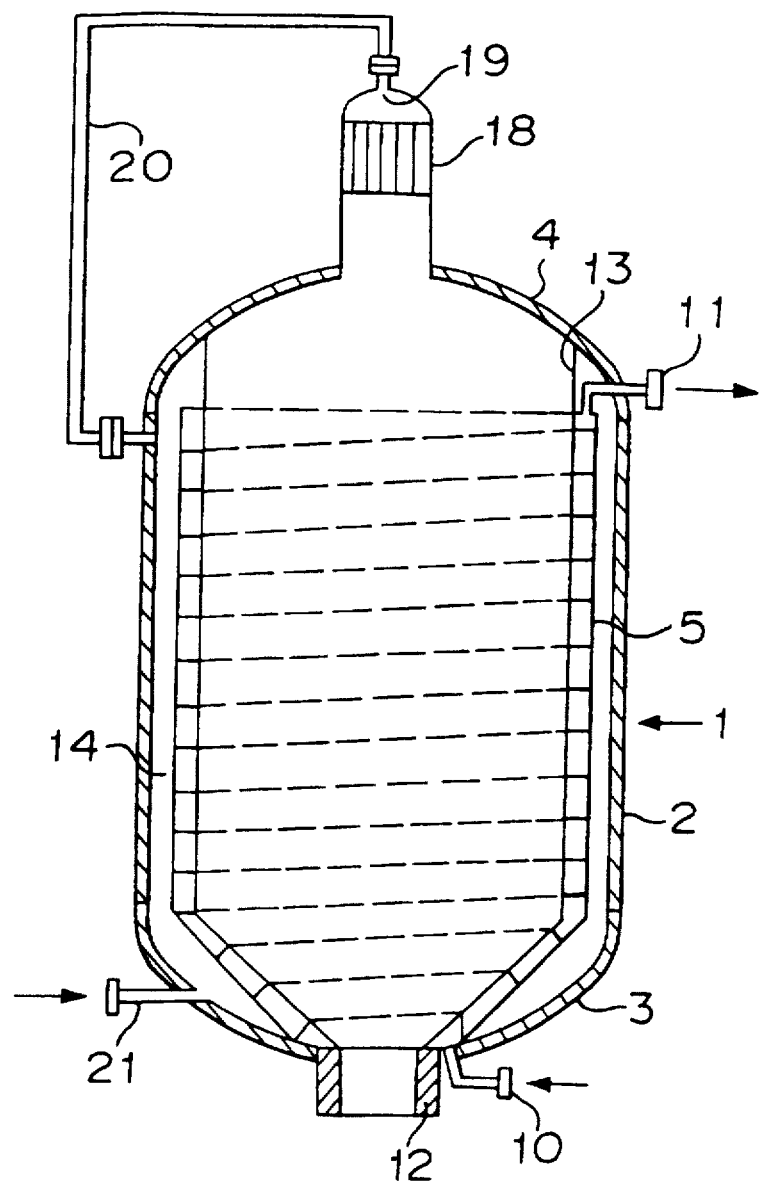
FIG. 8 is a longitudinal cross-sectional view of another embodiment of the temperature control element type reaction vessel having a communicating pipe for supplying liquid and a vessel side opening for liquid which is formed at the top of a reflux condenser, usable for practicing the method of the present invention.

The liquid can be supplied as follows;

(1) from a liquid supplying port formed at the main body chamber side of the pressure equalizing pipe, as shown in FIGS. 6 and 7;

(2) from a liquid supplying port formed at a lower part of the gap chamber, through the gap chamber and the communicating pipe, as shown in FIGS. 5 and 8.

In particular, according to the method of feeding the liquid via the gap chamber, stagnation of the liquid in the gap chamber can be prevented, and the danger of invasion and accumulation in the gap chamber of hydrogen chloride (hydrochloric acid) produced in polymerization reaction can be greatly reduced. Accordingly, there is little possibility causing the corrosion or the like.

In a case that the liquid supplying port is formed near the opening of the pressure equalizing pipe at the reaction vessel side as shown in FIGS. 6 and 7, it is preferably located at a vertical portion (a rising portion) of the pressure equalizing pipe. In this case, a nozzle type supplying port or a dispersion plate may be provided so that the entirety of the inner surface of the vertical pipe gets wet.

Figure 2:
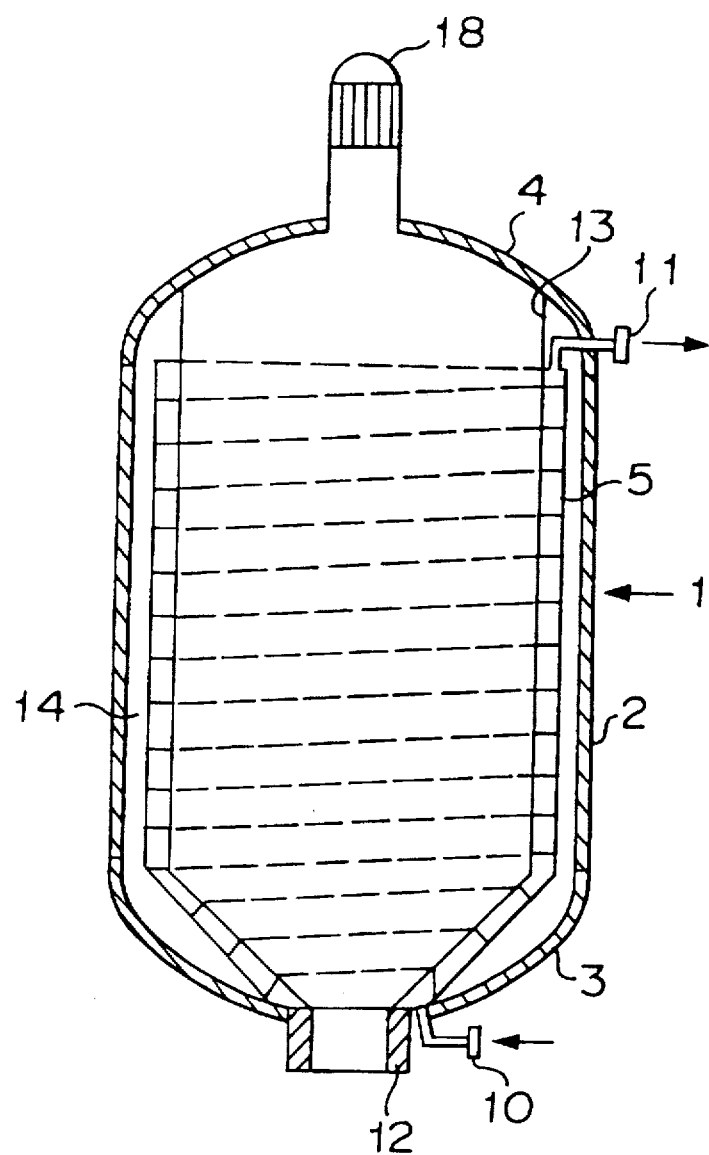
FIG. 2 is a longitudinal cross-sectional view of another embodiment of a temperature control element type reaction vessel with a reflux condenser usable for practicing the method of the present invention.

For the purpose of increasing the cooling capacity, a reflux condenser 18 may be equipped in a gaseous phase portion (a portion where the gaseous phase is formed during polymerization) at the upper end plate of the reaction vessel as shown in FIGS. 2, 7 and 8. In this case, the liquid should be supplied through the reflux condenser in order to prevent the scale formation and the deposition of the polymer particles in the reflux condenser. It is particularly preferable to set the reflux condenser vertically with the opening 19 of the pressure equalizing pipe at the reaction vessel side at the top of the condenser, for the efficiency of rinsing the deposits is very high.

Besides the opening of the pressure equalizing pipe at the reaction vessel side may be located in a conduit connected to the gaseous phase portion of the vessel. In this case, the number of nozzles connected to the upper end plate is reduced, and it is advantageous in design.

The rate of feeding the liquid is not limited in particular so far as the polymerization reaction or the quality of products are not adversely effected, and the total feed amount of the liquid should be adjusted to avoid the overcharging or the like. The total feed amount of the liquid, namely the above-mentioned liquid supply and the liquid supply via other nozzles of the reaction vessel for the purpose of preventing scale formation in these nozzles, should not exceed the volume decrease caused by the conversion of vinyl chloride type monomer to poly(vinyl chloride), thus the possibility of overcharging can be minimized.

Water used as a medium for polymerization, for instance, deionized water is preferably used as the liquid to be supplied. However, it is not particularly limited as far as it does not adversely effect the reaction or the quality of poly(vinyl chloride) product.

The flow passage for a heating medium in the temperature control element may be of a single helical form as shown in FIG. 1, or may be divided into a plurality of helical flow passages, or it assumes a zig-zag form although there is no limitation. Further, as shown in FIG. 3, the flow passage for heating medium in the temperature control element corresponding to a bottom end plate of the vessel body is in a helical form, and the flow passage for a heating medium in the temperature control element corresponding to a cylindrical trunk portion of the vessel body is in a zig-zag form in the circumferential direction.

As the heating medium to be passed in the flow passage, steam, warm water or the like is used. For cooling, water of room temperature for industrial purposes, water cooled in a separately provided refrigerator, a cooling medium such as ethylene glycol or the like, a cooling medium of low boiling point such as fleon or the like may be used. However, these are not particularly limited.

Equipment for the Reaction Vessel

In the method of the present invention, as an additional cooling device, the reflux condenser as shown in FIGS. 2, 7 and 8 may be provided as described above. A type and material for it are not particularly limited. For instance, a multipipe heat exchanger or the like wherein stainless steel is used as material for the contact area can be used as the reflux condenser which is conventionally used for the polymerization of vinyl chloride type monomer. The heat transferring surface area of the heat exchanger can be determined depending on a required quality of products, a degree of a load for removing heat, a method for controlling the load and so on. The method for controlling the load may be of a generally employed one. For instance, a method of controlling the amount of cooling water to be fed to the reflux condenser or the temperature of cooling water can be used.

For the purpose of preventing the stagnation or the deposition of scattered polymer particles, the reflux condenser is preferably installed in a gaseous phase portion of the reaction vessel, in particular, it is installed vertically at the upper end plate of the vessel by interposing a connection pipe or without interposing it.

The shape of impeller or buffle plates as an auxiliary device for the vessel is not particularly limited, and equipment or a device generally used for conventional suspension polymerization, emulsion polymerization and microsuspension polymerization can be used. For instance, as the impeller, there are turbine impellers, fan turbine impellers, multiturbine impellers, Phaudler type impeller, Brumargin type impeller, Fullzone type impeller and Maxblend type impeller. As the shape of the buffle plate, there are a plate type, a rod type, a D-type, a loop type, a finger type and so on.

Polymerization Recipe

In the present invention, the poly(vinyl chloride) is meant for a polymer comprising vinyl chloride as the main constituting units, which is obtainable by polymerizing a vinyl chloride type monomer in an aqueous medium. Further, in the present invention, the polymerization reaction period is meant for a period of time from the time when the reaction mixture reaches a predetermined polymerization temperature to the time when the internal pressure of the reaction vessel drops from the saturation pressure of the vinyl chloride type monomer at the reaction temperature to a predetermined pressure, so that recovery of the unreacted monomer is started.

Methods for polymerizing a vinyl chloride type monomer in an aqueous medium, which are commonly used for industrial production include suspension polymerization, emulsion polymerization and microsuspension polymerization. The suspension polymerization is usually carried out by polymerizing a vinyl chloride type monomer in an aqueous medium containing a dispersant in the presence of an oil-soluble polymerization initiator. The emulsion polymerization is carried out usually by polymerizing a vinyl chloride type monomer in an aqueous medium containing an emulsifier in the presence of a water-soluble polymerization initiator. Likewise, the microsuspension polymerization is carried out by homogenizing and polymerizing a vinyl chloride type monomer in an aqueous medium containing an emulsifier in the presence of an oil-soluble polymerization initiator.

Monomer

The vinyl chloride type monomer used in the method of the present invention includes a vinyl chloride monomer alone and a mixture of copolymerizable monomers containing a vinyl chloride monomer as the main component. Other monomers copolymerizable with the vinyl chloride monomer are not particularly limited and may be conventional monomers which are commonly used. Such other monomers include, for example, vinyl esters such as vinyl acetate, vinyl propionate and vinyl stearate, alkyl vinyl ethers such as methyl vinyl ether, ethyl vinyl ether, octyl vinyl ether, lauryl vinyl ether and cetyl vinyl ether, α-olefins such as ethylene, unsaturated monobasic acids such as acrylic acid and methacrylic acid, alkyl esters of such unsaturated monobasic acids, such as methyl (meth)acrylate and ethyl (meth)acrylate, unsaturated dibasic acids such as maleic acid, fumaric acid and itaconic acid, alkyl esters of such unsaturated dibasic acids, such as dimethyl maleate, dimethyl fumarate, dimethyl itaconate, diethyl maleate, diethyl fumarate, and diethyl itaconate, vinylidene compounds such as vinylidene chloride, and unsaturated nitriles such as acrylonitrile. One or more of such other copolymerizable monomers may be used usually in an amount of at most 30 wt %, preferably at most 20 wt %, relative to the vinyl chloride monomer. However, the amount is not particularly limited.

Dispersant

The dispersant employable in the method of the present invention, is not particularly limited, and it may be the one which is commonly employed in the suspension polymerization of a vinyl chloride type monomer. Such a dispersant may, for example, be partially saponified polyvinyl acetate (so-called polyvinyl alcohol), a cellulose derivative such as hydroxypropyl methyl cellulose, or a water-soluble polymer such as gelatin. Further, as a dispersion-assisting agent, an anionic surfactant such as sodium lauryl sulfate, or a nonionic surfactant such as a sorbitan fatty acid ester or a glycerol fatty acid ester, may also be used. Such dispersants or dispersion-assisting agents may be used alone or in combination as a mixture of two or more of them. Although the amount of the dispersant is not particularly limited, it is usually within a range of from 0.001 to 2 wt %, preferably from 0.03 to 1 wt %, based on the total amount of the vinyl chloride type monomer. And it may vary depending upon the type, the stirring intensity, the polymerization temperature, the type and composition of other monomers to be copolymerized with the vinyl chloride monomer, and the particle size of the intended vinyl chloride type polymer.

Emulsifier

The emulsifier to be used for the emulsion polymerization or microsuspension polymerization includes, for example, a higher alcohol sulfuric acid ester salt (alkali metal salt, ammonium salt), an alkylbenzene sulfonic acid salt (alkali metal salt, ammonium salt), an alkylsulfonic acid salt (alkali metal salt, ammonium salt), a higher fatty acid salt (alkali metal salt, ammonium salt), other anionic surfactants, non-ionic surfactants and/or cationic surfactants. These surfactants may be used alone or in combination as a mixture of two or more of them. The amount of the emulsifier is not particularly limited, and it is usually within a range of from 0.1 to 3 wt %, preferably from 0.3 to 1 wt %, relative to the vinyl chloride type monomer.

Such an emulsifier may be added for the foaming aid on processing. In such a case, it may be added after completion of the polymerization reaction separately from the emulsifier for polymerization.

Polymerization Initiator

The polymerization initiator to be used in the method of the present invention is not particularly limited, and it may be the one commonly employed in various polymerization methods.

The polymerization initiator to be used for suspension polymerization may, for example, a perester compound such as t-butyl peroxypivalate, t-butyl peroxyneodecanoate, t-hexyl peroxypivalate, t-hexyl peroxyneodecanoate or α-cumyl peroxyneodecanoate, a diacyl or dialkyl peroxide compound such as dilauroyl peroxide, a percarbonate compound such as diisopropyl peroxydicarbonate or di-2-ethylhexyl peroxydicarbonate, or an azo compound such as azobis(2,4-dimethylvaleronitrile) or azobisisobutyronitrile. These polymerization initiators may be used alone or in combination as a mixture of two or more of them.

The polymerization initiator to be used for emulsion polymerization may, for example, be a persulfate (sodium salt, potassium salt, ammonium salt), a water-soluble peroxide such as hydrogen peroxide, or a water-soluble redox initiator made of a combination of such a water soluble peroxide and a water-soluble reducing agent (such as sodium sulfite, sodium pyrosulfite, sodium hydrogensulfite, ascorbic acid or sodium formaldehyde sulfoxylate).

The polymerization initiator to be used for microsuspension polymerization may, for example, be a monomer-soluble (oil-soluble) initiator such as azobisisobutyronitrile, azobis(2,4-dimethylvaleronitrile), lauroyl peroxide or t-butyl peroxypivalate, or a redox type initiator made of a combination of such an oil-soluble initiator and the above-mentioned water-soluble reducing agent.

The amount of the polymerization initiator varies depending upon the type of the initiator, the polymerization temperature and the desired reaction time. However, it is usually within a range of from 0.01 to 1 wt % based on the total amount of the vinyl chloride type monomer.

Other Additives

Further, in the method of the present invention, various additives which are conventionally used in the polymerization of a vinyl chloride type monomer may be used. Typical additives are; a polymerization degree-controlling agent (chain transfer agent, crosslinking agent), an antioxidant, a pH-controlling agent, and an activating agent for the redox type initiator. The amounts of such additives may be the same as commonly employed for the conventional polymerization recipe of a vinyl chloride type monomer.

The polymerization degree-controlling agent to be used for the polymerization of a vinyl chloride type monomer may, for example, be a chain transfer agent such as trichloroethylene, carbon tetrachloride, 2-mercaptoethanol or octylmercaptan, or a crosslinking agent such as diallyl phthalate, triallyl isocyanurate, ethylene glycol diacrylate or a trimethylolpropane trimethacrylate.

Polymerization Method

Feed Method

In carrying out the method of the present invention, the feed ratio and the feed method for the aqueous medium to the reaction vessel, the vinyl chloride type monomer, the polymerization initiator, the dispersant for suspension polymerization, the emulsifier for emulsion polymerization or microsuspension polymerization, and other various additives, are not particularly limited.

Polymerization Temperature

The polymerization temperature employed in the method of the present invention varies depending upon e.g. the type of the polymerization initiator, the polymerization method, the presence or absence of the polymerization degree-controlling agent, and the desired degree of polymerization, but it is usually within a range of from 0° to 90° C., particularly from 40° to 70° C. Further, the polymerization temperature may be kept constant throughout the reaction, or it may be raised or reduced during the course of reaction.

Method for Terminating Polymerization

In the method of the present invention, as a method for terminating the polymerization reaction, a method of adding a so-called polymerization inhibitor or a polymerization terminating agent, or a method of recovering an unreacted monomer from the reaction vessel, may be mentioned.

Post Treatment Method

Operations such as dehydration and drying of a slurry of a poly(vinyl chloride) formed by suspension polymerization, are not particularly limited, and they may be dehydration-drying methods such as centrifugal dehydration/fluidized drying, which are commonly employed. An operation of drying a latex of a poly(vinyl chloride) formed by emulsion polymerization or microsuspension polymerization is not particularly limited, and it may be a means such as spray drying employing a rotary disc as an atomizer, or a spray nozzle of e.g. double fluid nozzle. Further, a concentration operation may be carried out so that a part of water in the latex is removed prior to drying to increase the concentration of the polymer in the latex, and an operation of classifying and pulverizing the product after drying, may be carried out.

Now, specific embodiments of the method of the present invention will be described with reference to Examples. However, it should be understood that the present invention is by no means restricted by the following specific Examples.

Evaluation of the physical properties of the obtained poly(vinyl chloride) was carried out according to the following methods.

Methods for Measuring the Physical Properties
① Average Degree of Polymerization and Bulk Density
Determined in accordance with the method shown in JIS K 6721.
② Fish Eye (FE)
100 g of a poly(vinyl chloride), 50 g of a plasticizer (DOP) and 3 g of a lead-type powder stabilizer were put together, and preliminarily mixed in a beaker. Then, the mixture was kneaded by rolls of 155° C. for 4 minutes, 5 minutes or 7 minutes, to prepare three types of sheets (thickness: 0.4 mm) differing in the kneading time. Then, the number of FE observed in a square of 5×5 cm (area: 25 cm$^2$) of each of the obtained sheets, is calculated to obtain the number of FE.

EXAMPLE 1

Into a temperature control element type reaction vessel, made of stainless steel having an inner volume of 400 l, provided with a gap chamber separated from a main body chamber and an agitator wherein the inner wall of the processing vessel (i.e., the surface of an inner barrel of a temperature control element) was processed by eletropolishing to be about Rmax 1.2 μm, 100 Kg of a vinyl chloride monomer, 150 Kg of deionized water, 60 g of partially saponified polyvinyl acetate as a dispersant, and 40 g of dioctyl peroxydicarbonate as an initiator were charged. Warm water was circulated into the temperature control element to raise the temperature to 57° C. to thereby initiate polymerization. The polymerization was carried out by maintaining the temperature until the conversion reaches a predetermined value. Then, unreacted vinyl chloride monomer was recovered and formed slurry was taken out. After ventilation, the reaction vessel was opened to observe the amount of scales deposited on the welded portion and other portions of the inner wall of the vessel. The results are shown in Table 1.

After the observation of the scales deposited, the inner wall of the vessel was washed with deionized water. Under the same condition as above, test was repeated by 5 batches.

Table 2 shows the results of evaluation of the properties of the poly(vinyl chloride) obtained in each batch measured by the above-mentioned method.

COMPARATIVE EXAMPLE 1

Figure 11:
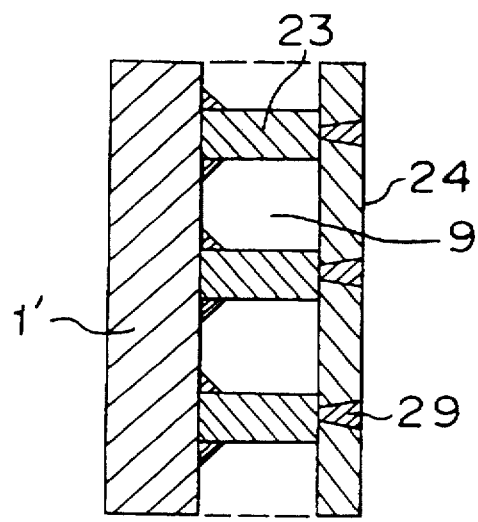
FIG. 11 is an enlarged view of an important portion shown another conventional vessel (of an inner jacket type)
Figure 10:
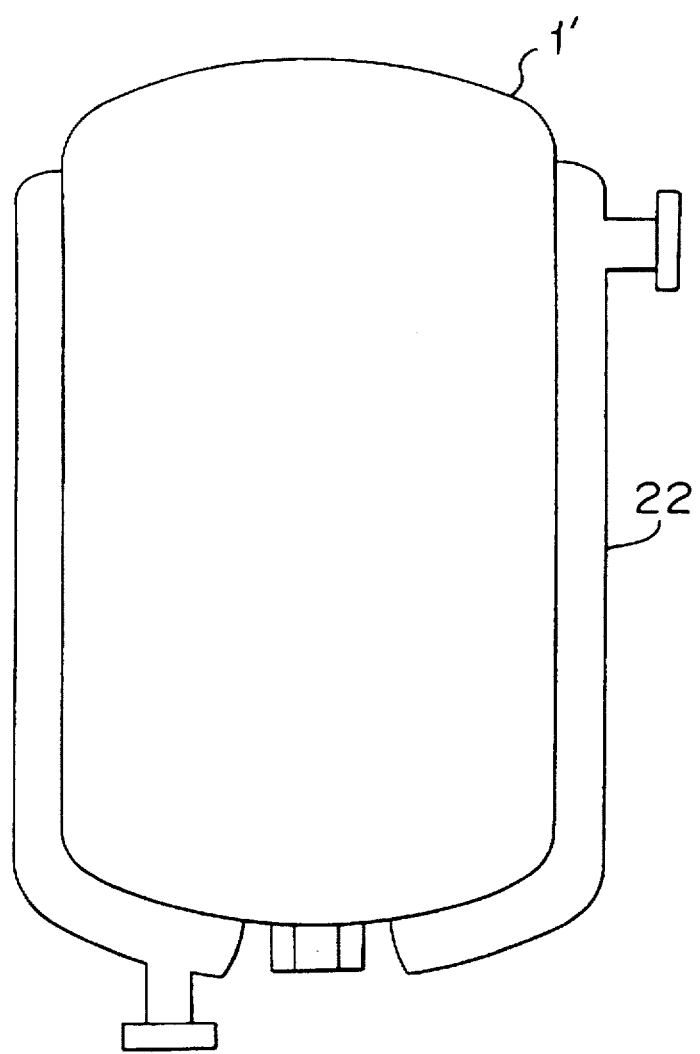
FIG. 10 is a diagram in longitudinally cross-sectioned which shows a conventional vessel (of an outer jacket type)
Figure 12:
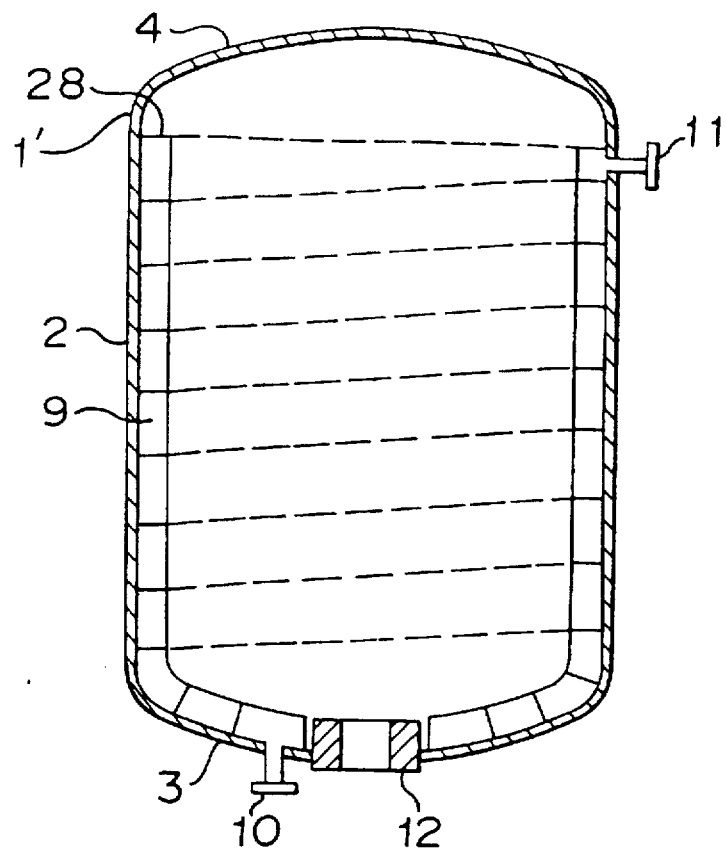
FIG. 12 is a longitudinal cross-sectional view showing a conventional temperature control element contacting type reaction vessel.
Figure 13:
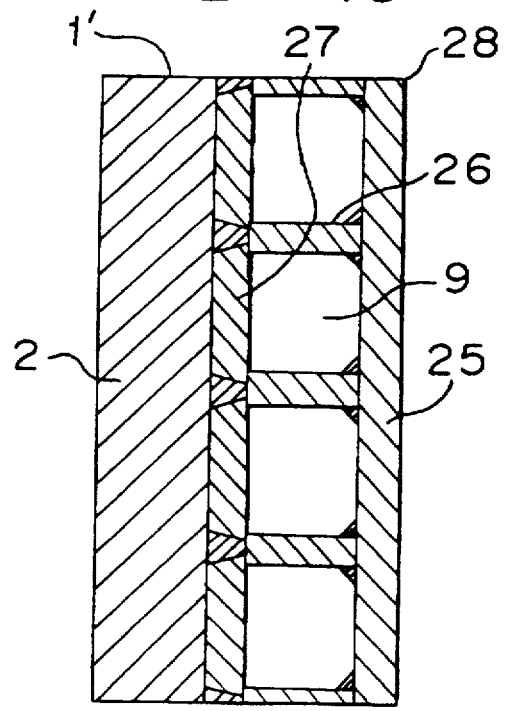
FIG. 13 is an enlarged view of an important portion of the conventional temperature control element contacting type vessel.

The polymerization of vinyl chloride monomer was carried out in the same manner as in Example 1 except that an inner jacket type reaction vessel as shown in FIG. 11 was used, and the same evaluation as in Example 1 was conducted. The results are shown in Table 1 and Table 2.

TABLE 1

| | | Portion of deposition | |
|---|---|---|---|
| | Batch number | Welded portion | Other portion |
| Example 1 | 1 | ○ | ○ |
| | 3 | ○ | ○ |
| | 5 | Δ | ○ |
| Comparative Example 1 | 1 | Δ | ○ |
| | 3 | x | Δ |
| | 5 | x | Δ |

Standard of judgment:
○ ... The amount of deposition is less than 10% of the surface area of the portion to be examined.
Δ ... The amount of deposition is 10% or higher but less than 50% of the surface area of the portion to be examined.
x ... The amount of deposition is 50% or higher of the surface area of the portion to be examined.

TABLE 2

| | Batch number | Degree of polymerization | Bulk density g/ml | Number of FE(*) 4 minutes | 5 minutes | 7 minutes |
|---|---|---|---|---|---|---|
| Example 1 | 1 | 1029 | 0.470 | 8 | 1 | 0 |
| | 3 | 1027 | 0.473 | 8 | 2 | 0 |
| | 5 | 1028 | 0.472 | 10 | 2 | 0 |
| Comparative Example 1 | 1 | 1025 | 0.472 | 9 | 2 | 0 |
| | 3 | 1026 | 0.472 | 120 | 8 | 2 |
| | 5 | 1028 | 0.474 | >500 | 16 | 5 |

(*)nos. in the sheet of 25 cm$^2$

EXAMPLE 2

The same temperature control element type reaction vessel as in Example 1 except that a communicating pipe 20 and a liquid supply port 21 as shown in FIG. 5 were provided so that water could be fed from the gap chamber through the communicating pipe to the main body chamber, was used.

Into this vessel, 100 Kg of a vinyl chloride monomer, 150 Kg of deionized water, 60 g of partially saponified polyvinyl acetate as a dispersant, and 40 g of dioctyl peroxydicarbonate as an initiator were charged. Warm water was circulated into the temperature control element to raise the temperature to 57° C. to thereby initiate polymerization. Throughout the polymerization reaction and unreacted monomer recovery, 17.5 l in total of deionized water was fed at a flow rate of 2.5 l/h from the gap chamber through the communicating pipe to the main body chamber by using a plunger pump. The polymerization was carried out by maintaining the temperature until the conversion reached a predetermined value. The reaction time was 6 hours. After the reaction was completed, unreacted vinyl chloride monomer was recovered outside of the system, and formed slurry was taken out. After ventilation, the reaction vessel was opened to observe the amount of scales deposited on the inner wall of the vessel.

After the observation of the scales deposited, the inner wall of the vessel was washed with deionized water. Under the same condition as above, polymerization was repeated by 5 batches. Table 3 shows the results of observation on the deposition of scales.

TABLE 3

| | Batch number | Deposition of scales |
|---|---|---|
| Example 2 | 1 | None |
| | 3 | None |
| | 5 | None |

EXAMPLE 3

Except that a multipipe reflux condenser (having a heat transfer surface area of 1 m$^2$) was vertically set on the upper end plate of the reaction vessel, and further, a communicating pipe 20 was connected to the top of the reflux condenser as shown in FIG. 8, the same temperature control element type vessel as in Example 2 was used. Likewise, a water inlet port (a liquid supply port) 21 was formed at the bottom of the gap chamber so that water could be supplied from the gap chamber through the communicating pipe and the reflux condenser to the main body chamber.

Into the vessel, 100 Kg of a vinyl chloride monomer, 150 Kg of deionized water, 60 g of partially saponified polyvinyl acetate as a dispersant, and 48 g of dioctyl peroxydicarbonate as an initiator were charged. Warm water was circulated into the temperature control element to raise the temperature to 57° C. to thereby initiate polymerization. Throughout the polymerization and the recovery of unreacted vinyl chloride monomer, 15 l in total of deionized water was fed at a flow rate of 2.5 l/h from the gap chamber through the communicating pipe to the vessel body chamber by using a plunger pump. 30 minutes after the initiation of the polymerization, cooling water was fed to the reflux condenser wherein an amount of the cooling water was adjusted so that a rate of removing heat was 4,000 kcal/hr.

The polymerization was carried out by maintaining the temperature until the conversion reached a predetermined value. The reaction time in this case was 5 hours. Thereafter, unreacted vinyl chloride monomer was recovered out of the system, and formed slurry was taken out. After the ventilation, the vessel was opened to observe the amount of scales deposited on the inner wall of the vessel.

After the observation of the scales deposited, the inner wall of the vessel was washed with deionized water. Under the same condition as above, polymerization was repeated by 10 batches. Table 4 shows the results of the observation on the deposition of scales.

TABLE 4

|  | Batch number | Deposition of scales |
| --- | --- | --- |
| Example 3 | 1 | None |
|  | 5 | None |
|  | 10 | None |

As described above, by employing a temperature control element type reaction vessel having a gap chamber of the polymerization of a vinyl chloride type monomer, the quality of poly(vinyl chloride) becomes excellent with little fish-eyes, and the productivity is also very high due to the high heat transfer coefficient while the formation and deposition of polymer scales are avoided.

When the gap chamber is communicated with a main body chamber by means of a pressure equalizing pipe, improvement in safety of operations can be attained. Further, by feeding liquid through the pressure equalizing pipe, the plugging of pipes can be prevented and therefore, it is effective for safe and stable operations.

What is claimed is:

1. A method for producing a poly(vinyl chloride) which comprises polymerizing vinyl chloride or a mixture of copolymerizable monomers containing vinyl chloride as the main component, in an aqueous medium, wherein said polymerization is carried out in a reaction vessel comprising a temperature control element, said temperature control element being formed by arranging partition plates at intervals at right angles to the outer surface of an inner barrel and overlaying outer strips on and between the ends of the partition plates opposite to the surface of the inner barrel to thereby form a flow passage unit having a flow passage for a heating medium defined by the partition plates, the inner barrel and the outer strips, attaching said temperature control element in a reaction vessel so as to provide a continuous gap between the outer side of the outer strips and the inner surface of said reaction vessel, and sealing the upper and lower portions of the gap formed between the outer strip side of the temperature control element and the inner surface of the reaction vessel to form a gap chamber.

2. A method for producing a poly(vinyl chloride) according to claim 1, wherein the reaction vessel has a reflux condenser at its upper end plate.

3. A method for producing a poly(vinyl chloride) according to claim 1, wherein the reaction vessel has a space surrounded by the inner surface of the reaction vessel and the inner barrel of the temperature control element communicating with the gap chamber by means of a communicating pipe.

4. A method for producing a poly(vinyl chloride) according to claim 2, wherein the main body chamber of said reaction vessel communicates with the gap chamber by means of a communicating pipe.

5. A method for producing a poly(vinyl chloride) according to claim 1, wherein the main body chamber of the reaction vessel communicates with the gap chamber by means of a pipe having a pressure equalizer.

6. A method for producing a poly(vinyl chloride) according to claim 5, wherein the pressure equalizer comprises a balancing piston pressure equalizer.

7. A method for producing a poly(vinyl chloride) according to claim 5, wherein the pressure equalizer comprises a diaphragm pressure equalizer.

8. A method for producing a poly(vinyl chloride) according to claim 1, wherein the pressure in the main body chamber of said reaction vessel and the pressure in the gap chamber are detected, and both pressures are made substantially equal by controlling the pressure in the gap chamber.

9. A method for producing a poly(vinyl chloride) according to claim 3, wherein a liquid is fed to the main body chamber during at least part of the polymerization reaction period by means of the communicating pipe or a pipe at the side of the main body chamber with respect to the pressure equalizer.

10. A method for producing a poly(vinyl chloride) according to claim 9, wherein the pressure equalizing pipe is a communicating pipe.

11. A method for producing a poly(vinyl chloride) according to claim 4, wherein a liquid is fed to the main body chamber of the reaction vessel through the communicating pipe during at least part of the polymerization reaction period.

12. A method for producing a poly(vinyl chloride) according to claim 10, wherein the liquid is fed from the gap chamber, through the communicating pipe, into the main body chamber of the reaction vessel.

13. A method for producing a poly(vinyl chloride) according to claim 11, wherein the liquid is fed from the gap chamber, through the communicating pipe, into the main body chamber of the reaction vessel.

14. A method for producing a poly(vinyl chloride) according to claim 11, wherein the liquid is fed through the communicating pipe, through a reflux condenser, into the main body chamber of the reaction vessel.

15. A method for producing a poly(vinyl chloride) according to claim 14, wherein the reflux condenser is installed in a vertical direction of the reaction vessel, and an opening of the communicating pipe at the main body chamber side of the reaction vessel is formed at the top of the reflux condenser.

16. A method for producing a poly(vinyl chloride) according to claim 9, wherein the liquid is continuously fed throughout the polymerization reaction period.

17. A method for producing a poly(vinyl chloride) according to claim 9, wherein the liquid fed is water.

18. A method for producing a poly(vinyl chloride) according to claim 9, wherein the total volume of the liquid fed is less than the amount corresponding to the volume decrease caused by the conversion of a vinyl chloride type monomer to poly(vinyl chloride).

19. A method for producing a poly(vinyl chloride) according to claim 1, wherein the polymerization is carried out in the reaction vessel in which the flow passage for the heating medium in the temperature control element is in a helical form.

20. A method for producing a poly(vinyl chloride) according to claim 1, wherein polymerization is carried out in the reaction vessel in which the flow passage for the heating medium in the temperature control element in a bottom end plate of the reaction vessel body is in a helical form, and the flow passage for the heating medium in the temperature control element in a trunk portion of the vessel body is in a zig-zag form in the circumferential direction.

* * * * *